United States Patent [19]

Jacquin et al.

[11] Patent Number: 6,107,227
[45] Date of Patent: Aug. 22, 2000

[54] BARIUM NEODYMIUM TITANATE DIELECTRIC CERAMIC COMPOSITION INCORPORATING SAMARIUM OXIDE FOR IMPROVED ELECTRICAL PERFORMANCE

[75] Inventors: Jeffrey Jacquin, Albuquerque; Dean A. Anderson, Corrales; Randy Rose, Rio Rancho, all of N. Mex.

[73] Assignee: CTS Corporation, Elkhart, Ind.

[21] Appl. No.: 09/127,744

[22] Filed: Aug. 3, 1998

[51] Int. Cl.[7] .................................................. C04B 35/468
[52] U.S. Cl. .......................... 501/138; 501/139; 264/614; 264/615
[58] Field of Search .................................... 501/138, 139; 264/614, 615

[56] References Cited

U.S. PATENT DOCUMENTS 5,612,268   3/1997  Iwamoto et al. ........................ 501/138
5,635,435   6/1997  Shibata ..................................... 501/138

*Primary Examiner*—Karl Group
*Attorney, Agent, or Firm*—Colin M. Raufer

[57] ABSTRACT

A high purity dielectric ceramic composition is disclosed. This composition provides improved electrical properties in the form of ultra-high electrical Q, a low ($T_f$) property and a high dielectric constant (K). This composition is also amenable to large scale manufacturing processes and operations. The composition provides a multi-oxide dielectric with $BaO$—$Nd_2O$—$Sm_2O_3$—$TiO_2$—$La_2O_3Bi_2O_3$ and ZnO as constituents. The composition materials effectively provide these desirable properties in a custom composition of various oxide materials advantageously including samarium oxide ($Sm_2O_3$).

25 Claims, 2 Drawing Sheets

BARIUM NEODYMIUM TITANATE DIELECTRIC CERAMIC COMPOSITION INCORPORATING SAMARIUM OXIDE FOR IMPROVED ELECTRICAL PERFORMANCE

FIELD OF THE INVENTION

This invention relates to ceramic dielectric compositions used extensively in the electronics industry, and more particularly, to a dielectric ceramic composition incorporating samarium oxide ($Sm_2O_3$) for improved electrical performance.

BACKGROUND OF THE INVENTION

The use of dielectric ceramic compositions for their desirable electrical properties is well known in the art. When such compositions are employed, certain electrical properties become particularly important. Material Scientists are then forced to balance the desire for certain electrical performance values against the need for materials that are easily manufacturable at reasonable temperatures and which may be easily scaled up for large volume manufacturing applications.

One important electrical property is the electrical Q (also referred to as "Q" or "Q-value") of a fired ceramic component. Electrical Q has a significant effect on the speed and quality of a soundwave through a ceramic component. As one typical application for these ceramic compositions is to provide frequency selectivity through filtering, a very high Q property is desired. When these ceramic dielectric compositions are used to form ceramic block filters, for example, they are pressed and fired with resonator through-holes formed therein. In such instances, the need for a high Q material is paramount.

Electrical Q may be dependent on a host of material properties, and may be drastically reduced by impurities, cracks, or poor grain boundaries in the ceramic composition. When a soundwave encounters such impediments as are described above, the soundwave will naturally slow in speed and require additional energy to effectively pass through the material composition. Conversely, a high-purity, well-processed ceramic composition may have a very high Q-values due to lack of impurities, cracks, and grain boundaries, resulting in efficient transport of an electronic signal through the material.

To a designer of electronic signal processing equipment such as cellular telephones, the importance of high electrical Q cannot be understated. High Q ceramic compositions result in components which use less power, thus increasing battery life and reducing the weight and volume of electronic devices. Additionally, a high Q ceramic composition may result in better overall performance by reducing background noise and increasing clarity in a cellular telephone, for example.

Electrical Q is intimately related to the insertion loss property of a ceramic filter, another important electrical property of interest to designers. For ceramic filter applications, high Q compositions provide filter frequency response curves which may have a narrower bandwidth and a correspondingly low insertion loss value. The desired low insertion loss specification may be met through other design techniques, however, if low insertion loss may be achieved at the material composition stage, designers are not forced to add extensive, labor and process intensive features in order to achieve the desired properties and performance.

Another important electrical property of any dielectric ceramic composition used for signal processing applications is the Temperature Coefficient of Frequency ($T_f$). In simple terms, this property is a measure of how much the frequency of a signal will shift as a function of temperature. As telecommunication devices typically require that specific signals remain in very narrow, predetermined frequency ranges, a most preferable ($T_f$) value would be zero. However, for most applications, a ($T_f$) range of +/−10 ppm/° C. is acceptable.

Still another important electrical property of a dielectric ceramic composition is its dielectric constant (K) (sometimes referred to as "$\epsilon_r$"). The dielectric constant is a unitless measure of a material. The effect of different materials is compared to that of air, that is, if a capacitor has a given capacitance when air is used as a dielectric, other materials used instead of air will multiply the capacitance by a certain amount called the dielectric constant (K). For ceramic dielectric compositions used in the electronics industry, and in the ceramic filter industry in particular, dielectric constant (K) values in the range of 80–100 are desired.

A perusal of the patent literature finds a few patents which address these issues with various dielectric ceramic compositions. One patent in this area of technology is U.S. Pat. No. 4,769,354 issued on Sep. 6, 1988 to inventors Beauger et al. for a "Type I Dielectric Composition Based on Neodymium Titanate". While this composition may be used in the manufacture of multilayer ceramic capacitors and the like, it also contains lead titanate (PbTiO3) which cannot be used in certain domestic manufacturing operations for environmental reasons. Moreover, this patent addresses the issue of providing a composition which frits at high temperatures in the range of 1300° C. These factors render this composition unacceptable for applicant's intended application.

U.S. Pat. No. 5,750,452 issued on May 12, 1998 to inventors Park et al. for a "Dielectric Ceramic Composition for Microwave" also addresses the need for a high Q, high dielectric constant, low $T_f$ material, but offers a composition which contains BaO, $Sm_2O_3$, $TiO_2$ and PbO. The lead content (PbO) of this material renders it unacceptable for applicant's intended application and manufacturing processes.

U.S. Pat. No. 5,077,247 issued on Dec. 31, 1991 to inventors Sato et al. describes a "Dielectric Ceramic for Microwave Applications". This composition may be readily distinguished from the applicant's invention because the Sato patent teaches the use of a BaO—$TiO_2$ composition which is completely different from applicant's BaO—$Nd_2O_3$ system.

U.S. Pat. No. 5,256,639 issued on Oct. 26, 1993 to inventors Fujimaru et al. describes a "Dielectric Ceramic Composition". This composition may be readily distinguished from the applicant's invention because the Fujimaru patent teaches the use of different amounts of the individual compositional elements; as well as a much lesser amount of samarium oxide ($Sm_2O_3$).

U.S. Pat. No. 5,493,262 issued on Feb. 20, 1996 to inventors Abe et al. describes a "Dielectric Ceramic Composition Containing ZNO—$B_2O_3$—$SiO_2$ Glass, Method of Preparing the Same, and Resonator and Filter using the Dielectric Ceramic Composition". This composition may be readily distinguished from the applicant's invention because the Abe patent also teaches the use of different compositional elements in a method type patent which encompasses some rare earth metal oxide materials.

A high purity dielectric ceramic composition which provided improved electrical properties in the form of ultrahigh electrical Q, a low ($T_f$) property and a high dielectric constant (K) while simultaneously being amenable to large scale manufacturing processes and operations and which contained a mixture of materials which effectively provided these desirable properties in a custom composition of various oxide materials advantageously including samarium oxide ($Sm_2O_3$) would be considered an improvement in the art.

DETAILED DESCRIPTION OF A PREFERRED EMBODIMENT

Figure 1:
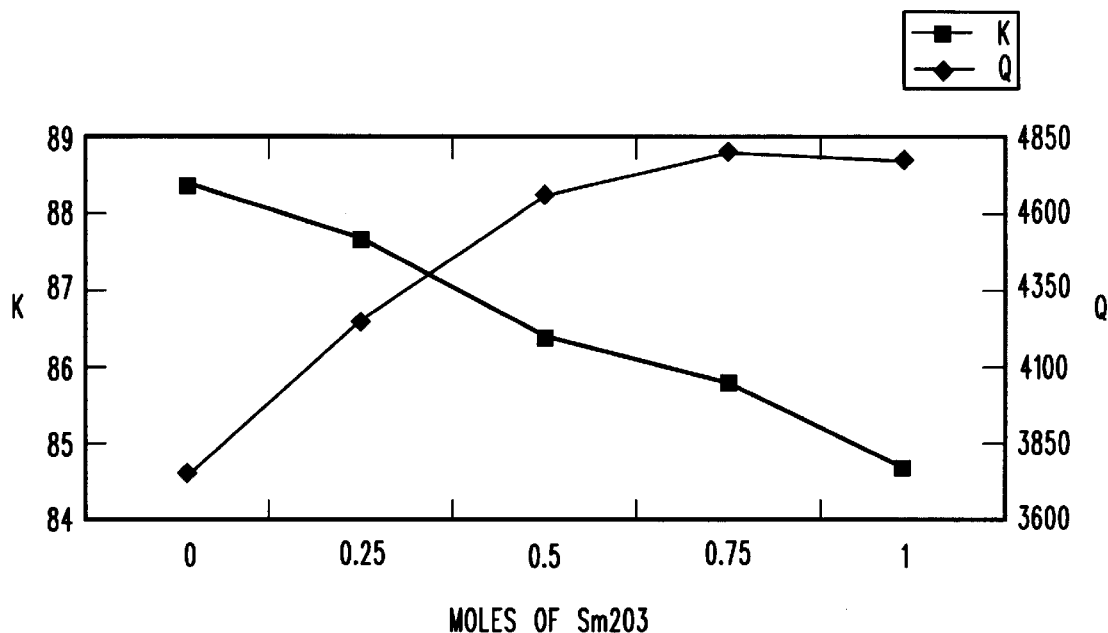
FIG. 1 shows a graph of the effect of samarium oxide ($Sm_2O_3$) on the electrical properties K and Q of the barium neodymium titanate composition.

One objective of the research presented below was to develop, in a laboratory environment, a dielectric composition having superior electrical properties, which would be capable of being scaled up in a large, high-volume factory operation and which could be easily controlled to produce repeatable, high yield, tight tolerance results.

Material Processing

A highly repetitious and standardized procedure was used to produce and test every batch numbered "Sample1" through "Sample 67" inclusive. That procedure is described in detail below. First, high purity raw materials were obtained from suppliers standard to the domestic ceramics industry.

The starting materials for each of the compositions were high purity powders. A barium carbonate ($BaCO_3$) material having a purity of 95% was used as a starting material. One possible means of obtaining such a material is from Solvay Performance Chemicals of Greenwich, Conn. A Neodymium Oxide ($Nd_2O_3$) material having a purity of 95% was also used as a starting material. One possible means of obtaining such a material is from Rhodia Corporation of Shelton, Conn. A Samarium Oxide ($Sm_2O_3$) material having a purity of 99% was also used as a starting material. One possible means of obtaining such a material is from Rhodia Corporation of Shelton, Conn. A bismith oxide ($Bi_2O_3$) material having a purity of 99% was also used as a starting material. One possible means of obtaining such a $Bi_2O_3$ material is from Metal Specialties Corporation of Fairfield, CT. A lanthanum oxide ($La_2O_3$) material having a purity of 99% was also used as a starting material. One possible means of obtaining such a material is from Meldform Corporation, of Herts, England. A titanium dioxide ($TiO_2$) material having a purity of 99% was also used as a starting material. One possible means of obtaining such a material is from Ishihara Corporation of San Francisco, Calif. A manganese carbonate material ($MnCO_3$) material having a purity of 99% was also used as a starting material. One possible means of obtaining such a material is from Chemetals Corporation of Baltimore, MD. A zinc oxide (ZnO) material was also used as a starting material. One possible means of obtaining such a material is also from Van Waters & Rogers Inc. of Phoenix, Ariz.

The starting materials were each weighed in proportions as set forth in Tables 1 through 16, using a standard laboratory scale such as a Mettler scale, Model number PM30000K, manufactured by Mettler Corporation of Worthington, Ohio. Next, the materials were mixed in to batches having a weight of approximately 1.25 kilograms. This weight was selected as an ideal batch size because of the smaller sized capital equipment in the laboratory and because larger sized batches may unnecessarily waste material for those batches with undesirable properties.

The batches were weighed by adding the largest ingredients (by weight) first, then adding smaller ingredients (by weight) to achieve the desired compositions. Once the batches were properly mixed, each was placed in a ball mill for wet mixing.

The next step of the operation involved wet mixing the compositions. This was accomplished in a 1.30 gallon ball mill container such as one manufactured by US Stoneware Corporation. Next, a grinding media in the form of fully-densified hardened aluminum oxide ($Al_2O_3$) or zirconium oxide ($Zr_2O_3$) pellets were placed into the ball mill container. When $Al_2O_3$ pellets were employed, they were obtained from Coors Ceramics Company, Golden, Colo. When $Zr_2O_3$ pellets were employed, they were obtained from Zircoa Corporation, Solon, Ohio. Next, 45 wt. % deionized water was placed into the ball mill container along with 1 wt. % tamol dispersant. The contents of the ball mill container were then mixed for 2–8 hours at 30 RPM.

The next step of the operation involved drying the raw materials in either plastic pans or spray drying the raw materials. If the compositions were subsequently dried in plastic pans, it was done at approximately 100° C. for 14–18 hours. The plastic pans were approximately 3–6 inches deep, and a layer of material 1–2 inches thick was dried in each pan. The dried cakes were broken up into smaller pieces and sifted before calcination. If a spray-drying technique was employed, the compositions were spray dried on a Yamato Mini Spray-Dryer before calcination. This resulted in a fine, powder-like composition.

The next step of the operation involved the important step of calcining. Calcining involves heating to high temperatures for an extended period of time in order to chemically react the various discrete components to form a single composition. For the composition of the present invention, a calcination process which required a soak at 1200° C. for approximately 4 hours was utilized. In the instant invention, the calcination operation was performed using a ramp-up and a ramp-down rate of approximately 2° C./minute in a Harrop Pusher Kiln. For the present composition, the ramp-up, peak, and ramp-down temperatures were purposefully chosen to fully react the material while simultaneously maintaining a high throughput for manufacturing purposes.

After the calcining operation, a wet mill step was performed in order to further reduce the particle size of the composition. Once again, a 1.30 gallon ball mill container was employed, the type of which may be obtained from US Stoneware Corporation. Once again, $Al_2O_3$ or $Zr_2O_3$ pellets were added along with 45 wt. % deionized water and 1 wt. % tamol dispersant into the ball mill container. The contents of the ball mill container were once again mixed for 2–8 hours at 30 RPM. After this stage of the material processing operation, the desired particle size was approximately 2 $\mu$m.

After the wet milling step, a wet milling drying operation was performed, substantially in accordance with the steps taken before the calcining operation for pan drying. In other words, the compositions were subsequently dried in plastic pans at approximately 100° C. for 14–18 hours. The plastic pans were approximately 3–6 inches deep, and a layer of material 1–2 inches thick was dried in each pan.

For the purposes of a laboratory analysis, the compositions were then ground using a standard mortar and pestle provided by Coors Ceramics Company, Golden Colo. A 1 wt. % PVA material was added to the composition in order to facilitate de-agglomeration of the various oxide particles. Similarly, approximately 1.2 wt. % PEG Plasticizer was added to the powder composition to create a powder that could be easily sifted and pressed.

Next, the powder was pressed to form green body cylinders for testing. These cylinders (also referred to as "wafers" or "substrates") were produced through the use of a standard laboratory press. A standard die having a substantially circular cavity was filled with a powder material. The cylinders were then pressed at pressures of approximately 10000 PSI for a period of 12 seconds each. From each different material composition batch, 4 pellets were produced, each having an approximate diameter of 1.10 inches and an approximate height of 1.0 inches.

Next, the green body cylinders were fired at a temperature of approximately 1345° C.–1370° C. for approximately 4 hours. This time/temperature profile was chosen to fully densify the material Accordingly, various different soak temperatures were chosen in order to realize a variety of different electrical properties and to evaluate the various samples under a variety of different firing conditions.

The dielectric constant (K) and the electrical Q of the compositions were measured by the Waake Coleman method. The resonant frequency used for the measurements fell in the range of 1.5 Ghz–2.0 Ghz depending upon the height of the sample. Further, the temperature coefficient $T_f$ of the compositions was measured directly between –40° C. to +85° C. using Hakki-Coleman parallel plates in a Sun System oven with calculations performed by LabView computer software.

Using a methodology substantially as is described above, a set of sixty-seven (67) distinct batch formulations were produced, tested, and evaluated. These batch formulations are referred to as Sample 1 through Sample 67 respectively. Significantly, changes to the starting materials, processing techniques, and temperatures were made in accordance with attempts to constantly streamline the process and improve compositional properties. Details of the formulation process are detailed through the following Tables and Examples provided below.

The present invention will be understood more readily with reference to the following Table 1 through Table 16, which describe in detail some of the compositions prepared in the course of this research. After each of the respective tables presented below, a discussion of the results of that table, as well as discussions of various examples and samples which help to explain this data will also be presented. It will be understood and appreciated by those skilled in the art, that it may not be possible to provide an exact piece of numerical data for each and every sample provided below. This may be a result of numerous factors including samples which are untestable due to processing, or unable to be tested due to error and/or variability in a corporate research environment. In those instances, the tables will be completely filled with a dashed line indicating that such a property could not be obtained for that particular sample. These tables and examples are intended to illustrate the invention only and should not be construed to limit the scope of the invention.

TABLE 1

Ceramic composition with BaO, Nd2O3, TiO2, La2O3, and Bi2O3.
(BaNd₂Ti 4.29 Bi 0.146 La 0.033 O 12.85)

| Sample number | Sm/Mn Content | Media | Drying Tech. | Green Dens. | Fired Dens. | K | K Rg. | Q | Tf |
|---|---|---|---|---|---|---|---|---|---|
| 01 | 0/0 | ZrO2 | pan | 3.17 | 5.52 | 86.5 | 1.1 | 3706 | 35.8 |
| 02 | 0/0 | Al2O3 | pan | 3.20 | 5.67 | 88.4 | 0.1 | 3706 | 30.1 |
| 03 | 0/0 | ZrO2 | spray | 3.17 | 5.27 | 80.5 | 0.3 | 2169 | 38.1 |
| 04 | 0/0 | Al2O3 | spray | 3.20 | 5.66 | 86.5 | 0.2 | 4623 | 25.3 |
| 05 | 0/0 | ZrO2 | pan | 3.09 | 5.17 | 78.4 | 0.7 | 820 | 36.6 |
| 06 | 0/0 | Al2O3 | pan | 3.06 | 5.50 | 84.7 | 0.1 | 4090 | 35.2 |
| 07 | 0/0 | ZrO2 | spray | — | — | — | — | — | — |
| 08 | 0/0 | Al2O3 | spray | 3.14 | 5.14 | 75.1 | 0.7 | 1501 | 34.1 |

Discussion of Table 1

At this stage of the research process, numerous fundamental decisions were made which had an enormous effect on the final results presented and claimed below. One decision involved the use of which media to use in the milling operation. It is conventionally believed, by those skilled in the art, that zirconium oxide pellets should be used as the milling media when working with dielectric compositions such as neodymium titanate and the like. This is because aluminum oxide pellets are believed to grind off themselves during the milling operation, thus adding a very fine mixture of aluminum oxide powder into the compositional powder mixture. This is believed to lower the electrical Q which renders aluminum oxide pellets unacceptable for mixing titanate compositions used in electronic materials applications.

Referring to Sample1 through Sample 8 shown above, it can be clearly seen that both aluminum oxide and zirconium oxide pellets were used as the milling media. Surprisingly, the aluminum oxide pellets did not adversely effect electrical Q but rather had the beneficial effect of reducing ($T_f$) without having any appreciable reduction in electrical Q. Thus, it was decided at this time to employ aluminum oxide pellets as the milling media of choice for the remainder of the batches samples (Sample 9 through Sample 67).

Another fundamental hypothesis was examined during the batching and testing of Sample 1 through Sample 8 above. Although most industry standard practices involve pan drying dielectric compositions after mixing and before calcining, it was speculated that electrical properties could be improved by spray-drying, using standard spray drying equipment, the dielectric compositions before the calcining step in the materials processing operation. Accordingly, when preparing samples 1 through 8, half were pan dried and half were spray dried before calcining. It was determined that spray drying did not improve electrical properties. Thus, it was decided to use pan drying as the preferred method of drying the milled material compositions for samples 9 through 63 and during large scale manufacturing operations.

Still another fundamental hypothesis was tested during the batching of samples 1 through 8, which involved the purity of the starting materials. Although it was clearly understood that higher purity materials would lead to improved properties over lower purity materials, it was postulated that certain low purity materials would offer acceptable electrical properties while providing significant cost advantages once this composition was moved out of the laboratory and produced in large volumes at the factory level. Therefore, some low purity samples were tested, along with the high purity samples, in the most preliminary stages of the research.

The use of low purity materials proved unacceptable even in small, controlled batches. The electrical results, as shown in Table 1 did not meet the desired criteria, and certain low purity samples could not even be properly tested. Thus it was decided that high purity materials, having a minimum purity of at least 95%, would be used for the remainder of the experiments, Sample 9 through Sample 67, respectively.

Once the electrical properties of samples 1 through 8 were measured, this data was analyzed and certain conclusions were made. Most significantly, the electrical Q values were substantially improved and above many traditional dielectric compositions. although it was understood that additional formulation steps would be necessary to "fine tune" the composition.

Nevertheless, it was also determined that the $T_f$ values were unacceptably high. Since the aluminum oxide pellet samples showed the most promising results, it was decided to continue to use aluminum oxide as a milling media. Nevertheless, it was determined that additional oxide materials would need to be added to the subsequent samples in an attempt to reduce or change the $T_f$.

Another electrical property which was measured in batches 1 through 8 was the dielectric constant (K). A desired range of values for the dielectric constant is approximately 80–90. In these samples, values in the 80's were obtained. Thus, it was believed that other properties could be improved while maintaining these acceptable K values.

The dielectric range (K range) is another important electrical property, which is related to the manufacturing operation. In practice, samples may be run through a kiln or other type of continuous furnace on setters which are stacked vertically. Aside from the important dielectric constant (K) values of each sample, the dielectric range measures the range of dielectric constants for the various samples which see slightly different temperature profiles during firing on different levels. For obvious reasons, a low range is desired and shows an efficient firing operation. In samples 1–8 described above, the range was unacceptably high. Thus, subsequent compositions were formulated with the intention of lowering the dielectric range. At this stage of the research, the prospect of including zinc oxide (ZnO) was first contemplated.

After preparing and subsequently testing Sample 1 through Sample 8, the applicants recognized that the $T_f$ values were unacceptably high for the intended application. It should be noted that Sample 7 did not properly achieve its fired density and thus no electrical properties could be obtained for this sample. Also, it was concluded that the low purity raw materials gave poor results. Additionally, it was concluded that $Al_2O_3$ media provide lower $T_f$ values, and that spray drying may not be a viable processing alternative. With this knowledge, applicants prepared more samples as described in Table 2 detailed below.

TABLE 2

Ceramic composition with BaO, Nd2O3, Sm2O3, TiO2, La2O3, and Bi2O3.
$(Ba(Nd_{2-x}Sm_x)Ti_{4.29}Bi_{0.146}La_{0.033}O_{12.85})$. In this composition, Sm2O3 was substituted for Nd2O3 to lower the Tf of the composition

| Sample number | Sm/Nd | Media | Drying Tech. | Green Dens. | Fired Dens. | K | K Rg. | Q | Tf |
|---|---|---|---|---|---|---|---|---|---|
| 09 | 0/2.0 | ZrO2 | pan | 3.08 | 5.23 | 82.3 | 0.5 | 4310 | 37.0 |
| 10 | 0.1/1.9 | ZrO2 | pan | 3.09 | 5.28 | 83.1 | 0.1 | 4310 | 33.8 |
| 11 | 0.3/1.7 | ZrO2 | pan | 3.13 | 5.29 | 82.2 | 0.3 | 4387 | 27.2 |
| 12 | 0.5/1.5 | ZrO2 | pan | 3.12 | 5.20 | 81.4 | 0.2 | 4381 | 23.0 |

Discussion of Table 2

At this stage of the research process, further changes were made to the composition, with the goal of achieving improved results in the electrical properties. Although the addition of $Sm_2O_3$ did have an effect on the $T_f$, and did lower the $T_f$ by an appreciable amount, it was suggested that the addition of still more $Sm_2O_3$ may further reduce $T_f$ values. Moreover, it was postulated that the use of $Al_2O_3$ milling media may still further have an effect on the $T_f$ properties of the composition. With these objectives in mind, another batch of compositions were prepared, and the results of these compositions are presented in tabular form below.

TABLE 3

Ceramic composition with BaO, Nd2O3, Sm2O3, TiO2, La2O3, and Bi2O3.
$(Ba(Nd_{2-x}Sm_x)Ti_{4.29}Bi_{0.146}La_{0.033}O_{12.85})$. In this composition, still more Sm2O3 was substituted for Nd2O3 to lower the Tf of the composition. Additionally, Al2O3 media were employed.

| Sample number | Sm/Nd | Media | Drying Tech. | Green Dens. | Fired Dens. | K | K Rg. | Q | Tf |
|---|---|---|---|---|---|---|---|---|---|
| 13 | 0/2.0 | Al2O3 | pan | 3.09 | 5.66 | 88.5 | 0.3 | 3663 | 31.1 |
| 14 | 0.25/1.75 | Al2O3 | pan | 3.15 | 5.67 | 87.7 | 0.4 | 4248 | 23.6 |
| 15 | 0.50/1.50 | Al2O3 | pan | 3.13 | 5.67 | 86.4 | 0.1 | 4641 | 15.4 |
| 16 | 0.75/1.25 | Al2O3 | pan | 3.17 | 5.68 | 85.9 | 0.1 | 4832 | 8.4 |
| 17 | 1.0/1.0 | Al2O3 | pan | 3.22 | 5.68 | 84.8 | 0.2 | 4805 | 1.09 |

Discussion of Table 3

Table 3 shows the very favorable effect that the addition of $Sm_2O_3$ may have on the $T_f$ values, an important aspect of the present invention. More specifically, referring to Sample 13 which contains no $Sm_2O_3$, the $T_f$ values are in excess of thirty (30). When even a small amount of $Sm_2O_3$ is added to the system, such as in Sample 14, the $T_f$ value decreases significantly. When this procedure of adding still more $Sm_2O_3$ is carried to its logical conclusion, the $T_f$ values may single digits, such as is shown in Sample 16 and Sample 17. Thus, the information provided in Table 3 shows the excellent results achievable in lowering $T_f$ values by adding $Sm_2O_3$. It was immediately apparent that the addition of samarium oxide ($Sm_2O_3$) for Neodymium Oxide ($Nd_2O_3$) resulted in drastically improved Q value. Moreover, it also became apparent that the $Sm_2O_3$ significantly lowered the $T_f$ values, an important objective in the composition formulation process. This concept was further explored as more compositional batches were prepared and analyzed. At this point in the research, it was decided to calibrate these seemingly positive results against some of the more traditional ceramic compositions in the industry. Thus, a slight diversionary track was taken for samples 18–20, which are presented in Table 4 below.

TABLE 4

Ceramic compositions with BaO, Nd2O3, TiO2, and Bi2O3. (BaNd2Ti 4.29 Bi 0.146 La 0.033 O 12.85). In this composition, no Sm2O3 was employed. (Sample 18: Ba1, Nd2, Ti5, Bi 0.5, O 14.75) (Sample 19: Ba1, ND2, Ti4, Bi 0.5, O 12.75) (Sample 20: Ba1, Nd2, Ti3, Bi 0.5, O 10.75)

| Sample number | Sm/Nd | Media | Drying Tech. | Green Dens. | Fired Dens. | K | K Rg. | Q | Tf |
|---|---|---|---|---|---|---|---|---|---|
| 18 | 0/2.0 | ZrO2 | pan | 3.28 | 5.73 | 100.3 | 0.2 | 2360 | — |
| 19 | 0/2.0 | ZrO2 | pan | 3.20 | 4.85 | — | — | — | — |
| 20 | 0/2.0 | ZrO2 | pan | 3.10 | 5.45 | — | — | — | — |

Discussion of Table 4

Table 4 confirmed that traditional ceramic compositions have electrical properties which may be improved upon with the addition of $Sm_2O_3$. The electrical properties of Sample 18 are standard to the electronics industry. No electrical properties could be tested for Sample 19 and Sample 20 as these compositions did not sinter properly. At this point in the research, a decision was made to once again focus on the addition of $Sm_2O_3$ to some more traditional type compositions, in order to lower $T_f$, while simultaneously improving other electrical properties. The results of this effort are presented in Table 5 below.

TABLE 5

Ceramic composition with BaO, Nd2O3, Sm2O3, TiO2, La2O3, and Bi2O3.
$(Ba(Nd_{2-x}Sm_x)Ti_{4.29}Bi_{0.146}La_{0.033}O_{12.85})$.

| Sample number | Sm/Mn Content | Media | Drying Tech. | Green Dens. | Fired Dens. | K | K Rg. | Q | Tf |
|---|---|---|---|---|---|---|---|---|---|
| 21 | 0/0 | Al2O3 | pan | 3.07 | 5.57 | 85.4 | 0.3 | 4375 | 34.4 |
| 22 | 0.25/0 | Al2O3 | pan | 3.07 | 5.54 | 84.8 | 0.4 | 4549 | 27.2 |
| 23 | 0.5/0 | Al2O3 | pan | 3.07 | 5.51 | 82.8 | 0.1 | 4704 | 16.8 |
| 24 | 0.75/0 | Al2O3 | pan | 3.13 | 5.51 | 82.2 | 0.1 | 4753 | 12.0 |
| 25 | 1.0/0 | Al2O3 | pan | 3.13 | 5.16 | 72.2 | 0.2 | 4220 | 4.8 |

Discussion of Table 5

Table 5 once again suggests that the addition of $Sm_2O_3$, particularly in the range of 0.75–1.0 moles, may significantly lower $T_f$, while simultaneously improving other electrical properties such as Q and K. In Sample 23 and Sample 24, the electrical Q values for the compositions were 4704 and 4753 respectively. These values are significantly higher than earlier samples and suggest that some of the traditional ceramic compositions may be reformulated to provide exceptional electrical properties. With that goal in mind, further samples were prepared, the results of which are presented in Table 6 below.

TABLE 6

Ceramic composition with BaO, Nd2O3, Sm2O3, TiO2, La2O3, and Bi2O3.
$(Ba(Nd_{2-x}Sm_x)Ti_{4.29}Bi_{0.146}La_{0.033}O_{12.85})$.

| Sample number | Sm/Mn Content | Media | Drying Tech. | Green Dens. | Fired Dens. | K | K Rg. | Q | Tf |
|---|---|---|---|---|---|---|---|---|---|
| 26 | 0.75/0 | Al2O3 | pan | 3.16 | 5.25 | 75.5 | 0.2 | 2987 | — |
| 27 | 1.0/0 | Al2O3 | pan | 3.18 | 4.58 | 57.2 | 0.0 | 3549 | — |
| 28 | 0.75/0 | Al2O3 | pan | 3.12 | 5.07 | 70.2 | 0.2 | 4031 | — |
| 29 | 1.0/0 | Al2O3 | pan | 3.15 | 4.68 | 59.6 | 0.0 | 3646 | — |

Discussion of Table 6

Table 6 shows data which is both lower in value and more varied than previous compositional batches. The inventors speculate that this may be a direct result of certain calcination issues which occurred during processing. Moreover, a possibility exists that there may be some neo-hydroxide formation which may, in fact, be contaminating the compositions and thus degrading their electrical properties. Nevertheless, the research endeavor continued moving forward with still more samples, as detailed in Table 7 presented below.

Discussion of Table 8

Samples 33–37 focused primarily on the additional mixing time required to achieve the proper material composition. In accordance with this experiment, Sample 34 was mixed for an additional two hours, Sample 35 was mixed for an additional four hours, Sample 36 was mixed for an additional six hours, and Sample 37 was mixed for an additional eight hours. The results showed that eight hours is the optimal mixing period for these powders. After eight

TABLE 7

Ceramic composition with BaO, Nd2O3, Sm2O3, MnCO3, TiO2, La2O3, and Bi2O3. $(Ba(Nd_{2-x}Sm_x)Ti_{4.29}Bi_{0.146}La_{0.033}O_{12.85})$.

| Sample number | Sm/Mn Content | Media | Drying Tech. | Green Dens. | Fired Dens. | K | K Rg. | Q | Tf |
|---|---|---|---|---|---|---|---|---|---|
| 30 | — | — | — | — | — | — | — | — | — |
| 31 | — | — | — | — | — | — | — | — | — |
| 32 | — | — | — | — | — | — | — | — | — |
| 33 | 1.0/0.003 | Al2O3 | pan | 3.24 | 5.57 | 81.0 | 0.2 | 4676 | −3.78 |

Discussion of Table 7

Samples 30–32 were unable to be processed due to sourcing problems associated with the $Sm_2O_3$. Additionally, the one successful sample which was processed (Sample 33), contained a prohibitively high (Mn) content which adversely effected the electrical properties. Significantly, a negative $T_f$ value was achieved. Such a $T_f$ value still falls within the desired specification. Moving forward, a reliable vendor for $Sm_2O_3$ was procured and the research continued. One important processing change, however, was instituted at this stage of the material development. The mixing time was increased for the samples described in Table 8 below, in order to achieve a more homogenous mixture. Sample 34 through Sample 37 are described in Table 8 presented below.

TABLE 8

Ceramic composition with BaO, Nd2O3, TiO2, La2O3, and Bi2O3. (BaNd2Ti 4.29 Bi 0.146 La 0.033 O 12.85)

| Sample number | Sm/Mn Content | Media | Drying Tech. | Green Dens. | Fired Dens. | K | K Rg. | Q | Tf |
|---|---|---|---|---|---|---|---|---|---|
| 34 | 0.0/0.0 | Al2O3 | pan | 3.05 | 5.36 | 81.3 | 0.9 | 4336 | — |
| 35 | 0.0/0.0 | Al2O3 | pan | 3.04 | 5.52 | 84.2 | 0.8 | 4608 | — |
| 36 | 0.0/0.0 | Al2O3 | pan | 3.02 | 5.18 | 75.1 | 3.5 | 3152 | — |
| 37 | 0.0/0.0 | Al2O3 | pan | 3.03 | 5.62 | 86.4 | 0.3 | 4698 | — | hours of mixing, it is believed that all the components then form a most homogenous mixture going into a calcine reaction. Once again, the electrical properties are below previous samples, possibly due to the formation of neohydroxide. Notably, no $T_f$ values were obtained for samples 34–37. With this additional information, more samples were prepared. Samples 38 and 39 are presented in Table 9 below.

TABLE 9

Ceramic composition with BaO, Nd2O3, Sm2O3, TiO2, La2O3, and Bi2O3. $(Ba(Nd_{2-x}Sm_x)Ti_{4.29}Bi_{0.146}La_{0.033}O_{12.85})$.

| Sample number | Sm/Mn Content | Media | Drying Tech. | Green Dens. | Fired Dens. | K | K Rg. | Q | Tf |
|---|---|---|---|---|---|---|---|---|---|
| 38 | 1.0/0.0 | Al2O3 | pan | 3.06 | 5.69 | 83.7 | 0.3 | 4928 | −1.29 |
| 39 | 1.0/0.0 | Al2O3 | pan | 3.05 | 5.58 | 82.2 | 0.1 | 4809 | — |

Discussion of Table 9

Samples 38–39 focused primarily on the effect of new milling media on the properties of the compositions. Whereas it is speculated that as the milling media grind together in their containers, they abrade against each other, resulting in powder particulates entering the composition. While Sample 39 used normal media, Sample 38 actually used a higher, more industry standard, media charge resulting in higher electrical values such as K, Q and $T_f$. These samples lead the experimenters to postulate that higher media charge results in much improved properties. With this newfound information, Samples 40–43 were prepared and the results of these compositions are presented in Table 10 below.

TABLE 10

Ceramic composition with BaO, Nd2O3, Sm2O3, TiO2, La2O3, and Bi2O3. $(Ba(Nd_{2-x}Sm_x)Ti_{4.29}Bi_{0.146}La_{0.033}O_{12.85})$.

| Sample number | Sm/Mn Content | Media | Drying Tech. | Green Dens. | Fired Dens. | K | K Rg. | Q | Tf |
|---|---|---|---|---|---|---|---|---|---|
| 40 | 1.0/0.0 | Al2O3 | pan | 3.09 | 5.39 | 78.1 | 0.3 | 4252 | — |
| 41 | 1.0/0.0 | Al2O3 | pan | 3.07 | 5.62 | 83.1 | 0.3 | 5025 | — |
| 42 | 1.0/0.0 | Al2O3 | pan | 3.02 | 5.70 | 83.6 | 0.1 | 5046 | −4.08 |
| 43 | 1.0/0.0 | Al2O3 | pan | 3.02 | 5.74 | 84.0 | 0.2 | 5153 | −4.41 |

Discussion of Table 10

The samples in Table 10 are significant for numerous reasons. First, each of the samples contains $Sm_2O_3$, which has been established to improve certain electrical properties. Second, these samples were mixed for various two-hours time increments (Sample 40 was mixed for 2 hours, Sample 41 was mixed for 4 hours, Sample 42 was mixed for 6 hours, and Sample 43 was mixed for 8 hours). Third, it is important to note that Samples 41–43 achieved Q values in excess of 5000, which is exceptional from a design performance perspective. Such results are rarely realized or even contemplated in the electronic materials industry. These samples revealed that a preferred mix time was approximately 6–8 hours. In view of these positive results, more compositions (Sample 44 through Sample 47) were prepared with additional (Mn) for sintering robustness. These results of these samples are presented in Table 11 below.

TABLE 11

Ceramic composition with BaO, Nd2O3, Sm2O3, MnCO3, TiO2, La2O3, and Bi2O3. $(Ba(Nd_{2-x}Sm_x)Ti_{4.29}Bi_{0.146}La_{0.033}O_{12.85})$.

| Sample number | Sm/Mn Content | Media | Drying Tech. | Green Dens. | Fired Dens. | K | K Rg. | Q | Tf |
|---|---|---|---|---|---|---|---|---|---|
| 44 | 1.0/0.000 | Al2O3 | pan | 3.07 | 5.70 | 82.5 | 0.2 | 5091 | −7.39 |
| 45 | 1.0/0.001 | Al2O3 | pan | 3.07 | 4.99 | 67.8 | 0.9 | 496 | — |
| 46 | 1.0/0.002 | Al2O3 | pan | 3.06 | 5.63 | 81.3 | 0.2 | 4950 | — |
| 47 | 1.0/0.003 | Al2O3 | pan | 3.08 | 7.77 | 62.0 | — | 550 | — |

Discussion of Table 11

The samples in Table 11 are substantially insignificant as these compositions did not provide consistent data. These results provided electrical properties substantially below prior batches and it is speculated that this may be due to an isolated inappropriate drying condition. Nevertheless, each of the samples in Table 11 was mixed for 8 hours. A decision was made to attempt to repeat these compositions in search of more consistent results and more consistent processing variables. These results are provided in Table 12 below.

Discussion of Table 12

The samples in Table 12 were each mixed for 8 hours, in accordance with prior samples. These results were once again favorable and provided further evidence that $Sm_2O_3$ is a desirable addition to standard ceramic compositions for electronic applications. These results also provided evidence that a preferred range of (Mn) is approximately 0.001 moles. The (Mn) may be added to the compositions in order to improve sintering and may also improve electrical proper ties. At this stage of the formulation, it was decided to move forward with compositions having 1.0 moles of $Sm_2O_3$,

TABLE 12

Ceramic composition with BaO, Nd2O3, Sm2O3, MnCO3, TiO2, La2O3, and Bi2O3. $(Ba(Nd_{2-x}Sm_x)Ti_{4.29}Bi_{0.146}La_{0.033}O_{12.85})$.

| Sample number | Sm/Mn Content | Media | Drying Tech. | Green Dens. | Fired Dens. | K | K Rg. | Q | Tf |
|---|---|---|---|---|---|---|---|---|---|
| 48 | 1.0/0.000 | Al2O3 | pan | 3.04 | 5.71 | 83.1 | 0.2 | 5145 | −4.88 |
| 49 | 1.0/0.001 | Al2O3 | pan | 3.05 | 5.71 | 83.8 | 0.1 | 5056 | −5.12 |
| 50 | 1.0/0.002 | Al2O3 | pan | 3.14 | 5.70 | 83.1 | 0.1 | 5168 | — |
| 51 | 1.0/0.003 | Al2O3 | pan | 3.13 | 4.68 | 58.4 | 0.9 | 916 | — |

0.001 moles of (Mn), and various amounts of (Zn). These samples were prepared and their results are presented in Table 13 below.

TABLE 13

Ceramic composition with BaO, Nd2O3, Sm2O3, MnCO3, TiO2, La2O3, Bi2O3, and ZnO. $(Ba(Nd_{2-x}Sm_x)Ti_{4.29}Bi_{0.146}La_{0.033}O_{12.85})$.

| Sample number | Sm/Mn Content | Media | Drying Tech. | Green Dens. | Fired Dens. | K | K Rg. | Q | Tf |
|---|---|---|---|---|---|---|---|---|---|
| 52 | 1.0/0.001 | Al2O3 | pan | 3.09 | 5.75 | 83.2 | 0.2 | 4188 | −4.50 |
| 53 | 1.0/0.001 | Al2O3 | pan | 3.10 | 5.73 | 80.9 | 0.2 | 3447 | — |
| 54 | 1.0/0.001 | Al2O3 | pan | 3.13 | 5.74 | 80.3 | 0.3 | 2919 | — |
| 55 | 1.0/0.001 | Al2O3 | pan | 3.18 | 5.73 | 79.5 | 0.2 | 2612 | −5.79 |

Discussion of Table 13

The samples in Table 13 focused on the addition of (Zn), in various amounts, to possibly improve electrical properties or possibly improve processing without adversely effecting electrical performance. Each of the samples in Table 13 were mixed for the desirable 8 hours. However, differing amounts of (Zn) were added to the compositions. Whereas Sample 52 contained only 0.03 moles of (Zn), Sample 53 contained 0.06 moles of (Zn), Sample 54 contained 0.09 moles of (Zn), and Sample 55 contained 0.12 moles of (Zn). The (Zn) material, it will be understood by those skilled in the relevant art, is a low melting material and may possibly aid in densification during firing. The results from this aspect of the experiment reveal that the (Zn) addition lowers the K value slightly and it lowers the Q values significantly. Nevertheless, the (Zn) material does improve the fired density (see Table 13) and provide a more dense, rugged, compact composition in the post-fired condition. Thus, in a preferred embodiment of the present invention, it may be desirable to add substantially smaller amounts of (Zn) in order to preserve the improved processing properties while simultaneously not adversely effecting the electrical properties. This strategy was employed in future samples discussed in detail in Tables 14–16 below.

Discussion of Table 14

Each of the samples in Table 14 were mixed for a period of 6 hours. Table 14 focused on the addition of a smaller amount of (Zn), to improve densification, act as a sintering aid, yet preserve the desirable electrical properties. The (Zn) material was added to the compositions in various amounts, as is described below. Sample 56 contained 0.001 moles of (Zn), Sample 57 contained 0.005 moles of (Zn), Sample 58 contained 0.01 moles of (Zn), and Sample 59 contained 0.02 moles of (Zn). An analysis of these specific samples revealed that the fired samples were very speckled with small impurities. It is postulated that the (Zn) material may not have properly dispersed throughout the composition. Thus, it was decided to prepare still more samples, with very specific predetermined amounts of (Zn). These results are provided in Table 15 below.

TABLE 14

Ceramic composition with BaO, Nd2O3, Sm2O3, MnCO3, TiO2, La2O3, Bi2O3, and ZnO. $(Ba(Nd_{2-x}Sm_x)Ti_{4.29}Bi_{0.146}La_{0.033}O_{12.85})$.

| Sample number | Sm/Mn Content | Media | Drying Tech. | Green Dens. | Fired Dens. | K | K Rg. | Q | Tf |
|---|---|---|---|---|---|---|---|---|---|
| 56 | 1.0/0.001 | Al2O3 | pan | — | — | 65.6 | — | 152 | — |
| 57 | 1.0/0.001 | Al2O3 | pan | — | — | 67.1 | — | 193 | — |
| 58 | 1.0/0.001 | Al2O3 | pan | — | — | 66.0 | — | 307 | — |
| 59 | 1.0/0.001 | Al2O3 | pan | 3.12 | 5.54 | 79.7 | 0.3 | 4364 | −3.81 |

TABLE 15

Ceramic composition with BaO, Nd2O3, Sm2O3, MnCO3, TiO2, La2O3, Bi2O3, and ZnO. (Ba(Nd$_{2-x}$Sm$_x$)Ti$_{4.29}$Bi$_{0.146}$La$_{0.033}$O$_{12.85}$).

| Sample number | Sm/Mn Content | Media | Drying Tech. | Green Dens. | Fired Dens. | K | K Rg. | Q | Tf |
|---|---|---|---|---|---|---|---|---|---|
| 60 | 1.0/0.001 | Al2O3 | pan | 3.13 | — | — | — | — | — |
| 61 | 1.0/0.001 | Al2O3 | pan | 3.14 | 5.66 | 82.3 | 0.2 | 4791 | — |
| 62 | 1.0/0.001 | Al2O3 | pan | 3.11 | 5.72 | 83.7 | 0.3 | 4717 | −3.00 |
| 63 | 1.0/0.001 | Al2O3 | pan | 3.13 | 5.60 | 81.7 | 0.2 | 4413 | — |

Discussion of Table 15

The main focus of the samples in Table 15 was to fine-tune a most desirable amount of (Zn) to add to these compositions which are already very close to a complete high electrical performance product. To that end, each of the samples in Table 15 were mixed for 6 hours. Sample 60 contained 0.001 moles of Zn. Sample 61 contained 0.005 moles of (Zn). Sample 62 contained 0.01 moles of (Zn). Sample 63 contained 0.02 moles of (Zn). One objective in selectively adding (Zn) in these amounts was to improve densification and electrical properties.

Sample 62 proved to be particularly desirable relative to its electrical properties. For example, the Q value was in excess of 4500, and the T$_f$ value was close to zero. Moreover, this sample exhibited a fired density in excess of 5.00. Sample 62 may also prove viable in a commercial manufacturing operation. Accordingly, in one preferred embodiment of the present invention, the formulation of Sample 62 may be employed.

An analysis of samples 60–63 revealed that the batches may still have contained non-uniform mixing and distribution of the (Zn) material. Thus, it is believed that only relatively small amounts of (Zn) should be added to any composition to provide best properties and repeatable results. At this stage of the research, one final variable remained to be tested. Table 16, presented below, investigates the role that (Sn) material will have in these ceramic compositions. These results are provided below in Table 16.

revealed that the Sn material did not significantly improve the properties of the material.

Analysis of Graphical Data

Figure 2:
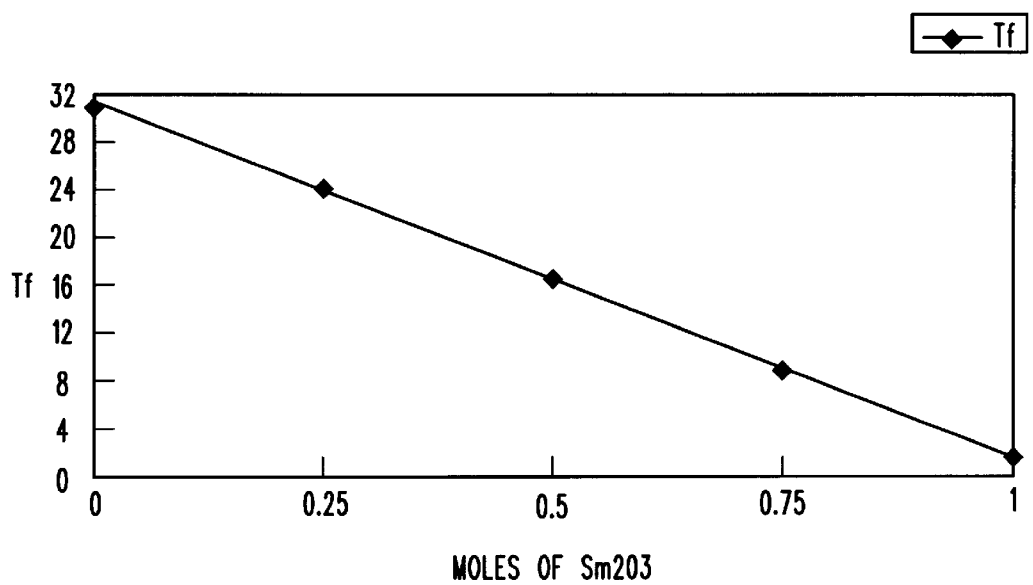
FIG. 2 shows a graph of the effect of samarium oxide ($Sm_2O_3$) on the electrical property $T_f$ of the barium neodymium titanate composition.
Figure 3:
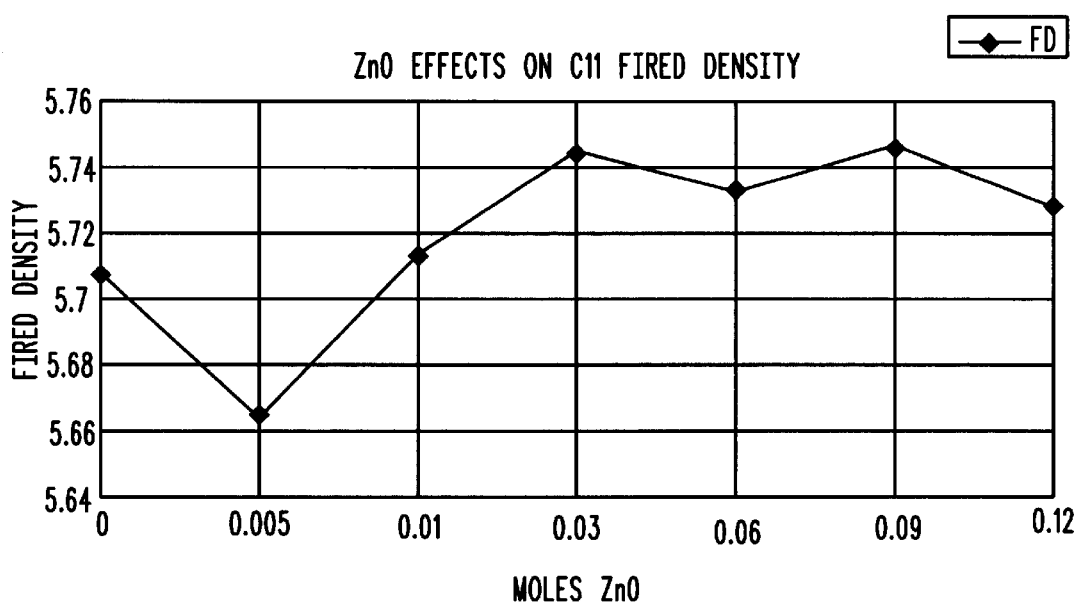
FIG. 3 shows a graph of the effect of zinc oxide ($ZnO_2$) on the fired density of the barium neodymium titanate composition.

In addition to the tables presented above which describe the formulation process in great detail, this invention may also be understood with reference to FIGS. 1–3 inclusive, which show in graphical format, important aspects of the present invention.

A better understanding of this invention may be achieved with reference to FIGS. 1–3, which show, in a graphical format, the effect of various materials upon the electrical properties of the final compositions.

Referring first to FIG. 1, a graph of the effect of samarium oxide (Sm$_2$O$_3$) on the electrical properties of K and Q are provided. In FIG. 1, the amount of Sm$_2$O$_3$ is provided along the x-axis, and measures between 0–1 mole of Sm$_2$O$_3$. Dielectric Constant (K) is measured along the vertical axis on the left side of the graph and measures between 84 and 89. Notably, as the Sm$_2$O$_3$ content is increased, the dielectric constant also increases. This trend continues from zero (0) to about 0.75 moles, whereupon the dielectric remains constant between approximately 88 and 89 as upwards of one (1) mole of Sm$_2$O$_3$ is added to the composition. This is significant because the higher dielectric constant, achieved through the addition of the Sm$_2$O$_3$, results in improved electrical performance, and ultimately telecommunications equipment with longer battery life, less interference, cross-talk, and background noise, and less power consumption.

TABLE 16

Ceramic composition with BaO, Nd2O3, Sm2O3, MnCO3, TiO2, La2O3, Bi2O3, ZnO, and SnO2. (Ba(Nd$_{2-x}$Sm$_x$)Ti$_{4.29}$Bi$_{0.146}$La$_{0.033}$O$_{12.85}$).

| Sample number | Sm/Mn Content | Media | Drying Tech. | Green Dens. | Fired Dens. | K | K Rg. | Q | Tf |
|---|---|---|---|---|---|---|---|---|---|
| 64 | 1.0/0.001 | Al2O3 | pan | 3.09 | 5.68 | 82.9 | 0.1 | 4629 | — |
| 65 | 1.0/0.001 | Al2O3 | pan | 3.09 | 5.65 | 81.8 | 0.6 | 4577 | — |
| 66 | 1.0/0.001 | Al2O3 | pan | 3.11 | 5.64 | 81.8 | 0.4 | 4565 | — |
| 67 | 1.0/0.001 | Al2O3 | pan | 3.15 | 5.46 | 77.8 | 0.2 | 4300 | — |

Discussion of Table 16

Table 16 addressed the addition of (Sn) to see if properties could be improved. Each of the samples in Table 16 were mixed for 6 hours. Moreover, each of the samples in Table 16 also contained 0.01 moles of Zn. Additionally, Sample 64 contained 0.001 moles of Sn. Sample 65 contained 0.005 moles of Sn. Sample 66 contained 0.01 moles of Sn. Sample 67 contained 0.02 moles of Sn. Analysis of this table Also provided on the graph of FIG. 1 is the effect of the addition of Sm$_2$O$_3$ on electrical Q. Although increasing the content Sm$_2$O$_3$ in the composition does cause a slight decrease in electrical Q, it should be noted that the electrical Q of compositions which contain Sm$_2$O$_3$ are significantly greater than other conventional dielectric compositions used in the industry. Whereas typical dielectric compositions may be expected to exhibit electrical Q values in the range of approximately 1500–2000, the compositions of the present invention may have Q values in excess of 3500. Thus, the electrical Q values, shown on the right side of the graph in FIG. 1, may advantageously vary between 3600 and 4850.

Perhaps an even greater effect of the addition of $Sm_2O_3$ is shown in FIG. 2. In FIG. 2, the effect of the addition of $Sm_2O_3$ on the temperature coefficient of frequency ($T_f$) is provided. $T_f$ is measured in units of parts-per-million-per-degree, and is shown along the vertical axis between 0 and 32. A low $T_f$ value is necessary to ensure the functionality of a telecommunications device, such as a cellular telephone for example. A low $T_f$ guarantees that an electronic device may be capable of operating in a variety of extreme and harsh environments. Thus, a low $T_f$ is a desirable property of a dielectric ceramic composition.

Referring to FIG. 2, the $T_f$ values decrease in a liner manner from approximately 31 at 0 moles of $Sm_2O_3$ to an amount less than 4 at 1 mole of $Sm_2O_3$. The low $T_f$ values, in conjunction with the high dielectric constant (K) and the high electrical Q values, render these compositions ideal for many telecommunication filtering applications.

FIG. 3 shows in graphical form, the effect of addition of zinc oxide (ZnO) on the fired density of the compositions. Referring to FIG. 3, the fired density is shown along the vertical axis and measures between 5.64 and 5.76. The amount of ZnO, measured in moles, is shown along the horizontal axis and is between 0 and 0.12 moles of ZnO. As is shown in the graph, as small amounts of ZnO are added to the composition, the fired density decreases slightly, then, as the amount of ZnO is increased, the fired density also increases. In the range of 0.03 to 0.12 moles, the fired density remains fairly constant above 5.72 and below 5.76. Accordingly, this greater fired density corresponds with an electrical component which has greater density, is more rugged, compact and preferred from a manufacturing perspective.

Each of the various components of the main composition are purposefully added in predetermined amounts so as to provide desirable properties to the final formulated material. Barium Neodymium Titanate, $BaO-Nd_2O_3-TiO_2$ is a material composition well known to the electronics industry. This material exhibits desirable electrical properties including a high dielectric constant, low loss, high electrical Q, low $T_f$, as well as other desirable breakdown characteristics. $Bi_2O_3$ is a glass former, which lowers the firing temperature of the composition. $Bi_2O_3$ has a lower melting temperature such that when it is added to a $BaO-Nd_2O_3-TiO_2$ composition, the overall firing temperature of the composition is decreased. Of course, along with a lower firing temperature, certain other electrical properties may simultaneously be decreased.

$La_2O_3$ serves to increase the electrical Q of the composition. It is postulated that this occurs because lanthanum is a rare earth oxide and thus may effectively alter the electrical properties of the composition.

The significance of adding samarium oxide ($Sm_2O_3$) to the composition may not be understated. It is believed that the $Sm_2O_3$ actually replaces the $Nd_2O_3$ in the lattice structure during the firing of this composition. This has an effect of both lowering the $T_f$ as well as increasing the electrical Q of the composition. The addition of this actual amount of samarium oxide, as provided in the detailed specification and the corresponding claims, is not believed to have been found heretofore in the prior art.

The $Mn_2O_3$ serves as a sintering aid. When these compositions are fired to temperatures in the range of 1300° C., the $Mn_2O_3$ serves to facilitate the complete and thorough sintering of the composition. The ZnO and the $SnO_2$ are added to the composition, in small amounts, in order to increase the fired density of the composition. Whereas ZnO and $SnO_2$ are oftentimes added to $BaO-TiO_2$ bodies and compositions, it is not commonly known or practiced to add ZnO and $SnO_2$ to $BaO-Nd_2O_3-TiO$, compositions.

In order to detect Sn and Zn in their most fundamental forms, one detection technique involves the use of a scanning electron microscope (SEM). Another detection technique involves an X-Ray diffraction technique. Using either of these techniques may detect either of these elements as minor elements. For more exact detection, it may be possible to use various spectroscopy techniques, including but not limited to atomic absorption, flame emission, and inductively coupled plasma. Stated another way, there are various technologically advanced methods for detecting Sn and Zn in these ceramic compositions.

Although one typical application for the instant invention involves a ceramic block filter, it will be understood by those skilled in the art that the desirable electrical properties of this composition enable it to be used in a variety of different applications including multilayer ceramic integrated circuits (MCIC), stripline or microstrip filters, voltage controlled oscillators (VCOs), multilayer capacitors, and the like. Of course, due the relatively high firing temperature required for this composition, it may be necessary to use higher melting temperature metal systems in any multilayer package utilizing this composition.

Although various embodiments of this invention have been shown and described, it should be understood that various modifications and substitutions, as well as rearrangements and combinations of the preceding embodiments, can be made by those skilled in the art, without departing from the novel spirit and scope of this invention.

What is claimed is:

1. A multi-oxide dielectric composition, comprising:
   (a) 15.38–15.67 mol % BaO
   (b) 7.69–15.67 mol % $Nd_2O_3$
   (c) 0–7.84 mol % $Sm_2O_3$
   (d) 66.01–67.25 mol % $TiO_2$
   (e) 0.254–0.27 mol % $La_2O_3$
   (f) 1.12–1.14 mol % $Bi_2O_3$
   (g) 0.02–1.85 mol % ZnO.

2. The dielectric composition of claim 1 having an average particle size of about 2.0 μm.

3. The dielectric composition of claim 1, wherein electrical properties are as follows:
   K=about 80 or above;
   Q=about 4000 or above; and
   $T_f$=about ±5 ppm. or less.

4. The dielectric composition of claim 1, further comprising $MnCO_3$ in an amount not more than 0.023 wt. % of the dielectric composition.

5. The dielectric composition of claim 1, further comprising about 0.01–0.28 mol % $SnO_2$.

6. A process for the preparation of a neodymium titanate powder, comprising the steps of:

forming a dielectric composition having about 15.38–15.67 mol % BaO; about 7.69–15.67 mol % $Nd_2O_3$; about 0–7.84 mol % $Sm_2O_3$; about 66.01–67.25 mol % $TiO_2$; about 0.25–0.27 mol % $La_2O_3$; about 1.12–1.14 mol % $Bi_2O_3$; about 0.02–1.85 mol % ZnO; and about 0.014–0.28 mol % $SnO_2$;

drying said dielectric composition;

calcining said dielectric composition at temperatures of 1300° C.–1400° C. for a period of about 16–24 hours;

wet milling for about 2–8 hours;

drying said dielectric composition in a pan for about 6–12 hours; and spray-drying said dielectric composition to form a fine grain powder composition having a particle size of about 2 μm.

7. The process of claim 6, further comprising the step of pressing the composition to form a ceramic monoblock filter.

8. The process of claim 6, further comprising the steps of forming said powder composition into green sheets of dielectric tape material and laminating the green sheets to provide a mutilayer ceramic integrated circuit package having at least two electrode layers.

9. A dielectric composition, comprising:

(a) 15.38–15.67 mol % BaO
(b) 7.82–9.80 mol % $Nd_2O_3$
(c) 5.88–7.84 mol % $Sm_2O_3$
(d) 67.15–67.25 mol % $TiO_2$
(e) 0.26–0.26 mol % $La_2O_3$
(f) 1.14–1.14 mol % $Bi_2O_3$
(g) 0.02–0.16 mol % ZnO.

10. The dielectric composition of claim 9 having an average particle size of about 2.0 μm.

11. The dielectric composition of claim 9, further comprising about 0.01–0.28 mol % $SnO_2$.

12. The dielectric composition of claim 9, wherein electrical properties are as follows:

K=about 80 or above;
Q=about 4000 or above; and
$T_f$=about ±5 ppm. or less.

13. The dielectric composition of claim 9, further comprising $MnCO_3$ in an amount between about 0.008–0.023 wt. % of the dielectric composition.

14. A process for the preparation of a neodymium titanate powder, comprising the steps of:

forming a dielectric composition having about 15.38–15.67 mol % BaO; about 7.82–9.80 mol % $Nd_2O_3$; about 5.88–7.83 mol % $Sm_2O_3$; about 67.15–67.25 mol % $TiO_2$; about 0.26–0.26 mol % $La_2O_3$; about 1.14–1.14 mol % $Bi_2O_3$; and about 0–0.16 mol % ZnO;

drying said dielectric composition;

calcining said dielectric composition at temperatures of 1300° C.–1400° C. for a period of about 16–24 hours;

wet milling for about 2–8 hours;

drying said dielectric composition in a pan for about 6–12 hours; and spray-drying said dielectric composition to form a fine grain powder composition having a particle size of about 2 μm.

15. The process of claim 14, further comprising the step of pressing the composition to form a ceramic monoblock filter.

16. The process of claim 14, further comprising the steps of forming said powder composition into green sheets of dielectric tape material and laminating the green sheets to provide a mutilayer ceramic integrated circuit package having at least two electrode layers.

17. A dielectric composition, comprising:

(a) about 15.65 mol % BaO
(b) about 7.82 mol % $Nd_2O_3$
(c) about 7.83 mol % $Sm_2O_3$
(d) about 67.15 mol % $TiO_2$
(e) about 0.26 mol % $La_2O_3$
(f) about 1.14 mol % $Bi_2O_3$
(g) about 0.16 mol % ZnO.

18. The dielectric composition of claim 17 having an average particle size of about 2.0 μm.

19. The dielectric composition of claim 17, further comprising about 0.01–0.28 mol % $SnO_2$.

20. The dielectric composition of claim 17, wherein the electrical properties are as follows:

K=about 80 or above;
Q=about 4000 or above; and
$T_f$=about ±5 ppm. or less.

21. The dielectric composition of claim 17, further comprising $MnCO_3$ in an amount about 0.008 wt. % of the dielectric composition.

22. A process for the preparation of a neodymium titanate powder, comprising the steps of:

forming a dielectric composition having about 15.65 mol % BaO; about 7.82 mol % $Nd_2O_3$; about 7.83 mol % $Sm_2O_3$; about 67.15 mol % $TiO_2$; about 0.26 mol % $La_2O_3$; about 1.14 mol % $Bi_2O_3$; and about 0.16 mol % ZnO;

drying said dielectric composition;

calcining said dielectric composition at temperatures of 1300° C.–1400° C. for a period of about 16–24 hours;

wet milling for about 2–hours;

drying said dielectric composition in a pan for about 6–12 hours; and spray-drying said dielectric composition to form a fine grain powder composition having a particle size of about 2 μm.

23. The process of claim 22, further comprising the step of pressing the composition to form a ceramic monoblock filter.

24. The process of claim 22, further comprising the steps of forming said powder composition into green sheets of dielectric tape material and laminating the green sheets to provide a mutilayer ceramic integrated circuit package having at least two electrode layers.

25. A multi-oxide dielectric composition, comprising:

$Ba_1 Nd_1 Sm_1 Ti_{4.29} La_{0.033} Bi_{0.146} Zn_{0.01} O_{12.86}$ and .0008 wt % $MnCO_3$.

* * * * *